(12) United States Patent
Steelman

(10) Patent No.: US 7,347,470 B2
(45) Date of Patent: Mar. 25, 2008

(54) MECHANISM FOR SECURING A GRAB HANDLE TO AN ARMREST

(75) Inventor: James Lloyd Steelman, Sterling Heights, MI (US)

(73) Assignee: Intier Automotive Inc., Newmarket (CA)

( * ) Notice: Subject to any disclaimer, the term of this patent is extended or adjusted under 35 U.S.C. 154(b) by 160 days.

(21) Appl. No.: 11/189,239

(22) Filed: Jul. 26, 2005

(65) Prior Publication Data

US 2007/0024085 A1 Feb. 1, 2007

(51) Int. Cl.
*B60N 3/02* (2006.01)

(52) U.S. Cl. .................. 296/1.09; 296/153; 296/71

(58) Field of Classification Search .............. 296/153, 296/1.09, 71; 403/381; B60N 3/02
See application file for complete search history.

(56) References Cited

U.S. PATENT DOCUMENTS

| | | | |
|---|---|---|---|
| 2,760,813 A * | 8/1956 | Colm | 296/68.1 |
| 3,038,757 A * | 6/1962 | Schulze | 296/153 |
| 3,497,252 A * | 2/1970 | Laing | 292/336.3 |
| 3,554,530 A | 1/1971 | Moore | |
| 3,634,925 A | 1/1972 | Van Loo | |
| 4,667,979 A * | 5/1987 | Wolff | 280/752 |
| 5,072,983 A * | 12/1991 | Muroi et al. | 296/37.13 |
| 5,205,606 A * | 4/1993 | Cassese | 296/153 |
| 5,244,300 A * | 9/1993 | Perreira et al. | 403/381 |
| 5,519,917 A * | 5/1996 | Cordonnier | 16/422 |
| 5,542,654 A | 8/1996 | Johanson | |
| 5,586,898 A | 12/1996 | Anderson et al. | |
| 5,664,793 A * | 9/1997 | Engibarov | 279/124 |
| 5,690,042 A | 11/1997 | Bentley | |
| 6,032,590 A * | 3/2000 | Chen | 108/158.12 |
| 6,158,728 A | 12/2000 | Smith | |
| 6,213,538 B1 * | 4/2001 | Scheidmantel et al. | 296/153 |

FOREIGN PATENT DOCUMENTS

JP    2005035357 A  *  2/2005

* cited by examiner

*Primary Examiner*—Dennis H. Pedder
*Assistant Examiner*—Mike Hernandez
(74) *Attorney, Agent, or Firm*—Honigman Miller Schwartz and Cohn LLP

(57) ABSTRACT

An armrest assembly secured to a substrate comprising an armrest having a cavity and at least one tee lock, a grab handle having a least one side wing, and wherein the grab handle is secured to the cavity of the armrest by operatively engaging the at least tee lock with the at least one side wing.

13 Claims, 5 Drawing Sheets

MECHANISM FOR SECURING A GRAB HANDLE TO AN ARMREST

TECHNICAL FIELD

The present invention generally relates to armrest assemblies in a vehicle and in particular, to an armrest including a grab handle.

BACKGROUND OF THE INVENTION

The automotive industry is increasingly focusing on improvements within the interior of the vehicle. As a result, the design and esthetics of the interior space of the vehicle is becoming more important to the manufacturer and the end customer. As improvements are made to the interior of the vehicle, new materials and new technologies are required to manufacture the various interior trim components.

For instance, a door trim of the vehicle may include several components that are attached to the door trim during secondary processes. These components may be manufactured from the same material, or from different materials, depending upon their location and function. When two trim pieces are secured together, problems arise with achieving a repeatable, balanced gap between the two trim pieces. Particularly, it becomes difficult to visually align part lines of the two trim pieces and maintain consistent gaps between the two trim pieces. Stability of the two trim pieces may also be compromised if either of the two trim pieces is not properly secured to the door trim.

One method of creating greater repeatability and stability of mating parts is to include additional alignment features, such as fasteners or adhesives. However, these features require additional parts, that add weight, labor costs and part costs to the manufacture of the vehicle.

SUMMARY OF THE INVENTION

The inventors of the present invention have recognized these and other problems associated with designing components for the interior of a vehicle. To this end, the inventors have invented an armrest assembly secured to a substrate comprising an armrest having a cavity and at least one tee lock, a grab handle having a least one side wing, and wherein the grab handle is secured to the cavity of the armrest by operatively engaging the at least tee lock with the at least one side wing.

DETAILED DESCRIPTION

Figure 1:
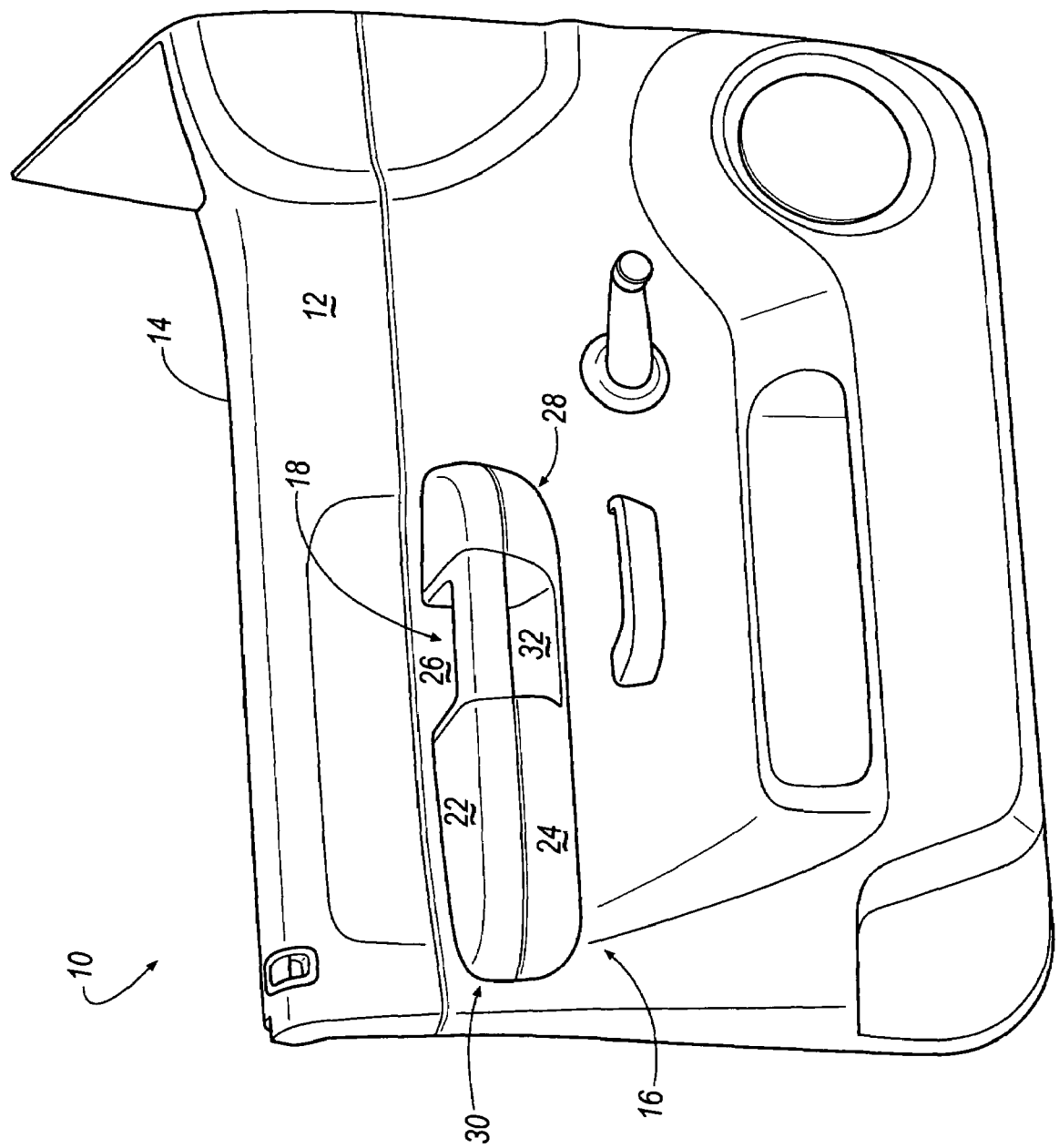
FIG. 1 is an isolated view of a vehicle door trim according to an embodiment of the invention.
Figure 2:
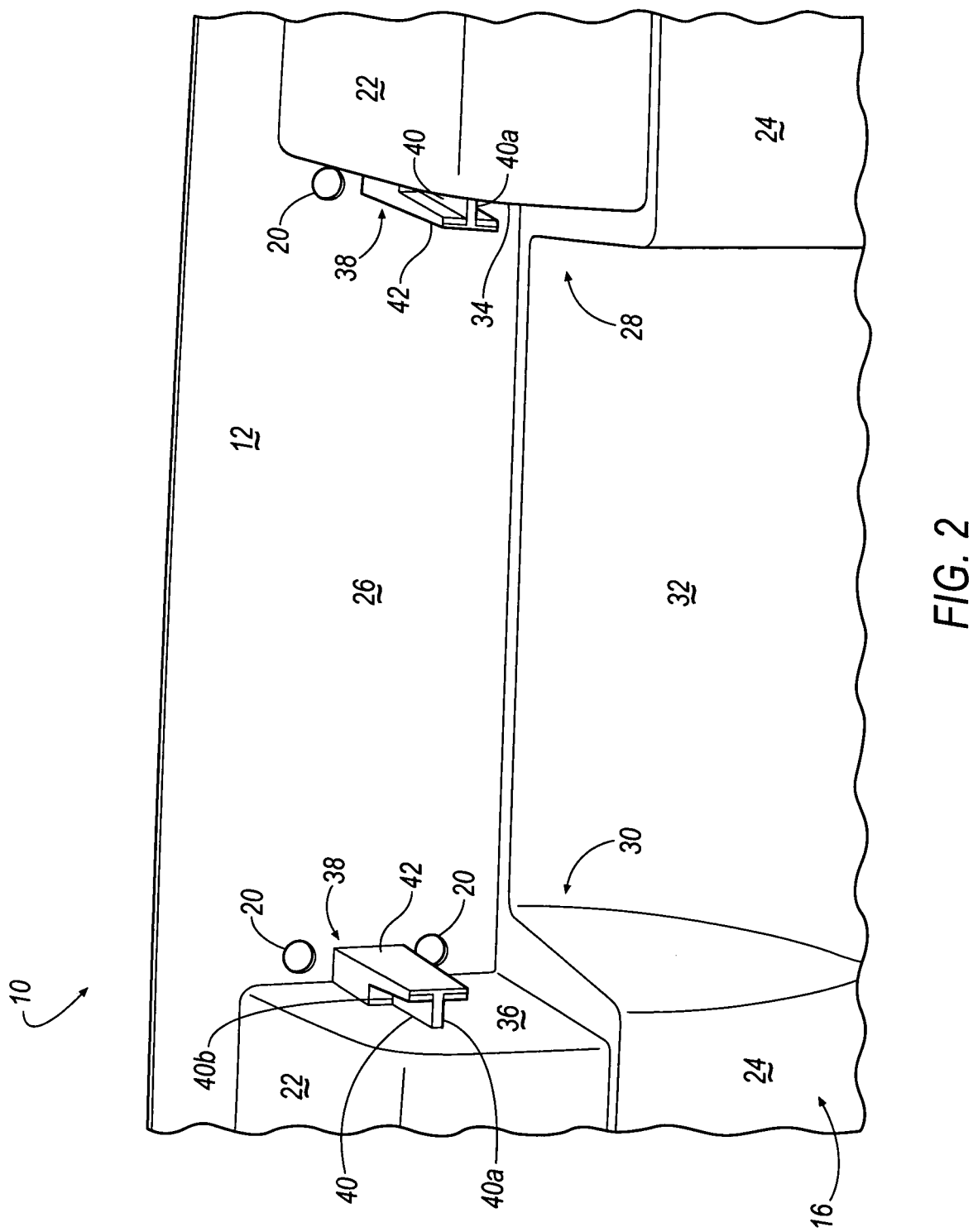
FIG. 2 is an enlarged view of a plurality of tee locks secured to the vehicle door trim according to an embodiment of the invention.

Referring to the Figures, a vehicle door substrate ("substrate") is generally shown at 10. The substrate 10 comprises of an inner, or "A" surface 12 visible to an occupant of the vehicle, and an outer, or "B" surface 14 that is not visible to the occupant. The substrate 10 includes, amongst other features, an armrest 16 and a grab handle 18. As illustrated in FIG. 2, substrate 10 further includes apertures 20, which will be discussed in greater detail below.

The armrest 16 is attached to the inner surface 12 of the substrate 10 and grab handle 18 is secured to armrest 16. It can be appreciated that armrest 16 may be integrated into substrate 10 during the manufacturing of substrate 10. Alternatively, armrest 16 may be secured to the inner surface 12 of the substrate 10 through a secondary process, such as, for example, by welding, by fasteners or by adhesives.

As illustrated, armrest 16 may be formed from a top portion 22 and a bottom portion 24 for ease of manufacturing armrest 16. Top portion 22 and bottom portion 24 may be generally symmetrical with respect to each other and secured together by conventional methods.

Armrest 16 and grab handle 18 may be manufactured from the same material, or from different materials. For example, armrest 16 may be manufactured from a polyvinyl chloride and grab handle 18 may be manufactured from a polyurethane. Further, both armrest 16 and grab handle 18 may be covered with a decorative layer of material, or scrim (not shown).

Referring to FIG. 2, armrest 16 includes a cavity 26, dent, gap, pocket, or the like. Cavity 26 separates armrest 16 into a front portion 28 and a rear portion 30. As illustrated, top portion 22 of armrest 16 is disjoined into separate front and rear portions 28, 30 by cavity 26, while front and rear portions 28, 30 of bottom portion 24 remain joined by an intermediate surface 32. Cavity 26 may be generally U-shaped and defined by opposing exposed surface 34 of the front portion 28 and exposed surface 36 of the rear portion 30 and by either substrate 10 or intermediate surface 32.

Exposed surfaces 34, 36 of front and rear portions 28, 30 may include a tee lock 38. Tee lock 38 may be integrated into exposed surfaces 34, 36 of front and rear portions 28, 30 of armrest 16 during the manufacture of armrest 16. It can be appreciated by those skilled in the art that exposed surfaces 34, 36 of the front and rear portion 28, 30 may be angled at approximately 3 degrees so as to prevent a condition, known by those skilled in the art, as "die lock" in the mold tool (not shown) from occurring during the manufacture of armrest 16. In other words, providing an angle to exposed surfaces 34, 36 of front and rear portions 28, 30 allows the mold tool to properly open and close without armrest 16 during the manufacture and/or removal of armrest 16 from the mold tool. According, it can be appreciated by those skilled in the art, that exposed surfaces 34, 36 may be angled at any degree so long as the mold tool for armrest 16 does not damage armrest 16 during the manufacture and/or removal of armrest 16 from the mold tool.

Tee lock 38 comprises a seat 40 and a tapered guide 42. Seat 40 may extend horizontally outwardly from exposed surfaces of front and rear portion 34, 36. Seat 40 may have a uniform thickness, or as illustrated, may gradually increase in thickness from an end 40a to an opposing end 40b. Tapered guide 42 may extend vertically above and below seat 40 at approximately a 90 degree angle. In the illustrated embodiment, as tapered guide extends from edge 40a to opposing edge 40b, tapered guide 42 may increase in thickness. Further, tapered guide 42 may connect to exposed surfaces 34, 36 of front and rear portions 28, 30 beyond seat 40.

Figure 3:
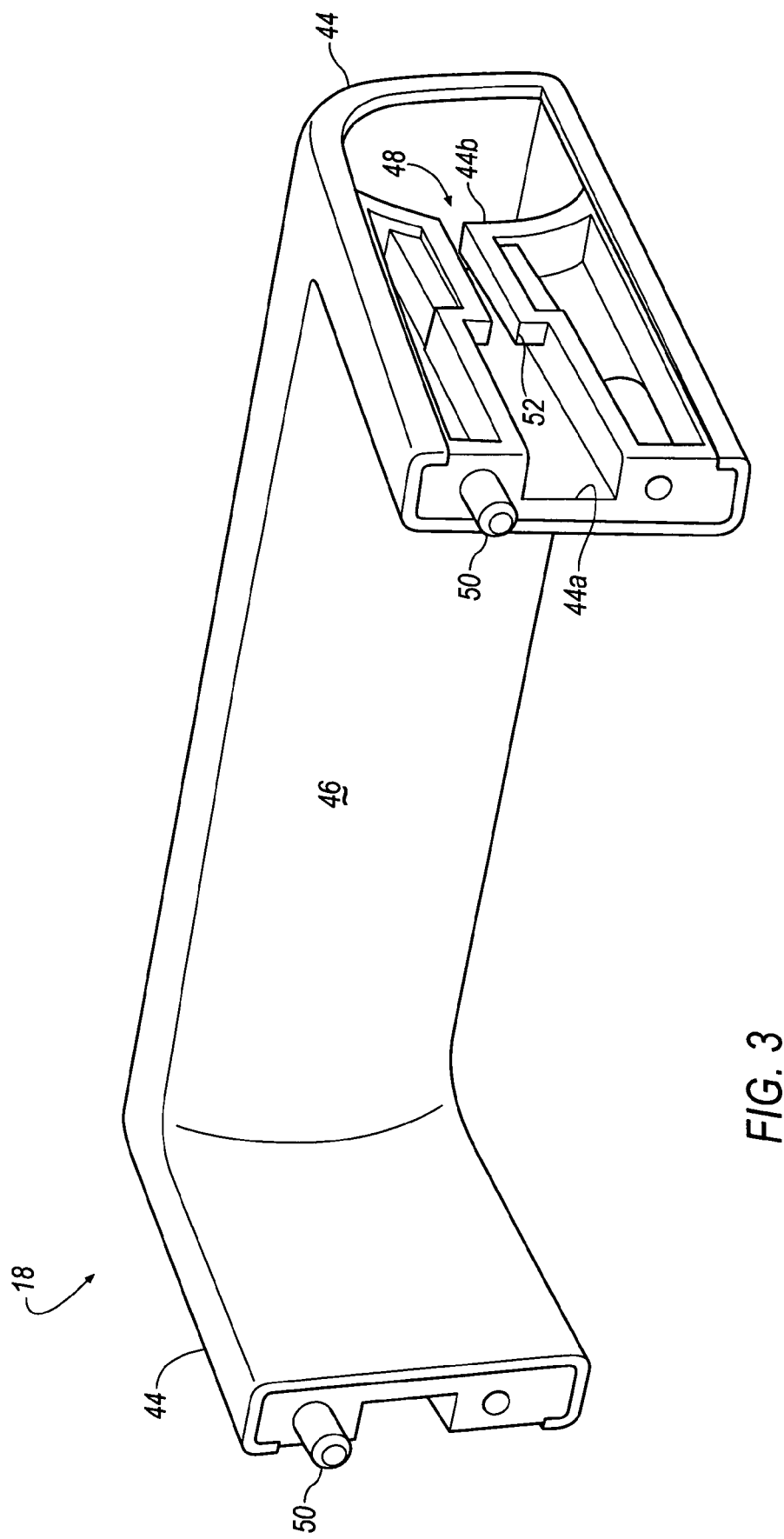
FIG. 3 is an isolated view of a grab handle according to an embodiment of the invention.
Figure 4:
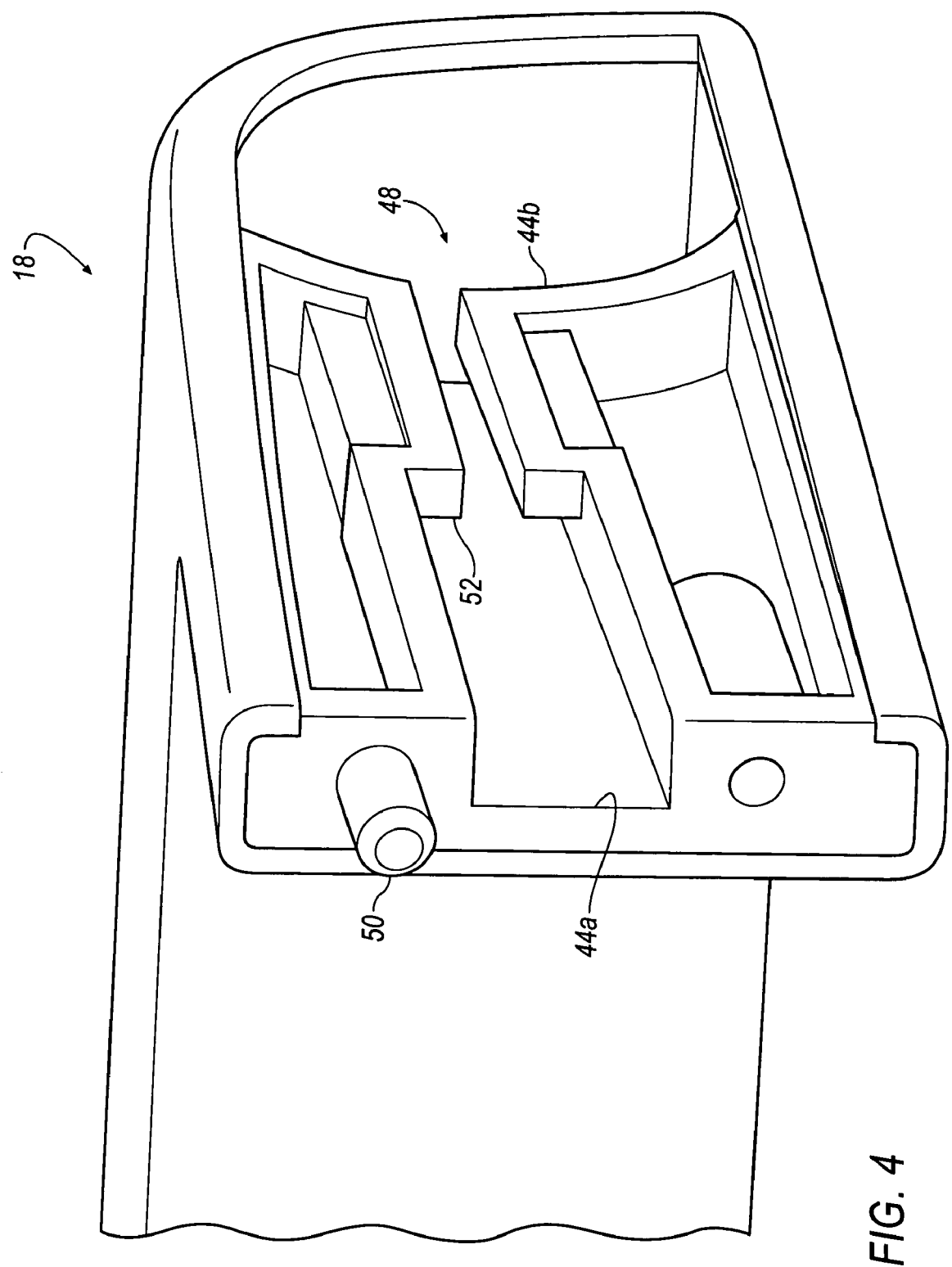
FIG. 4 is an enlarged perspective view of a wing of the grab handle according to an embodiment of the invention.
Figure 5:
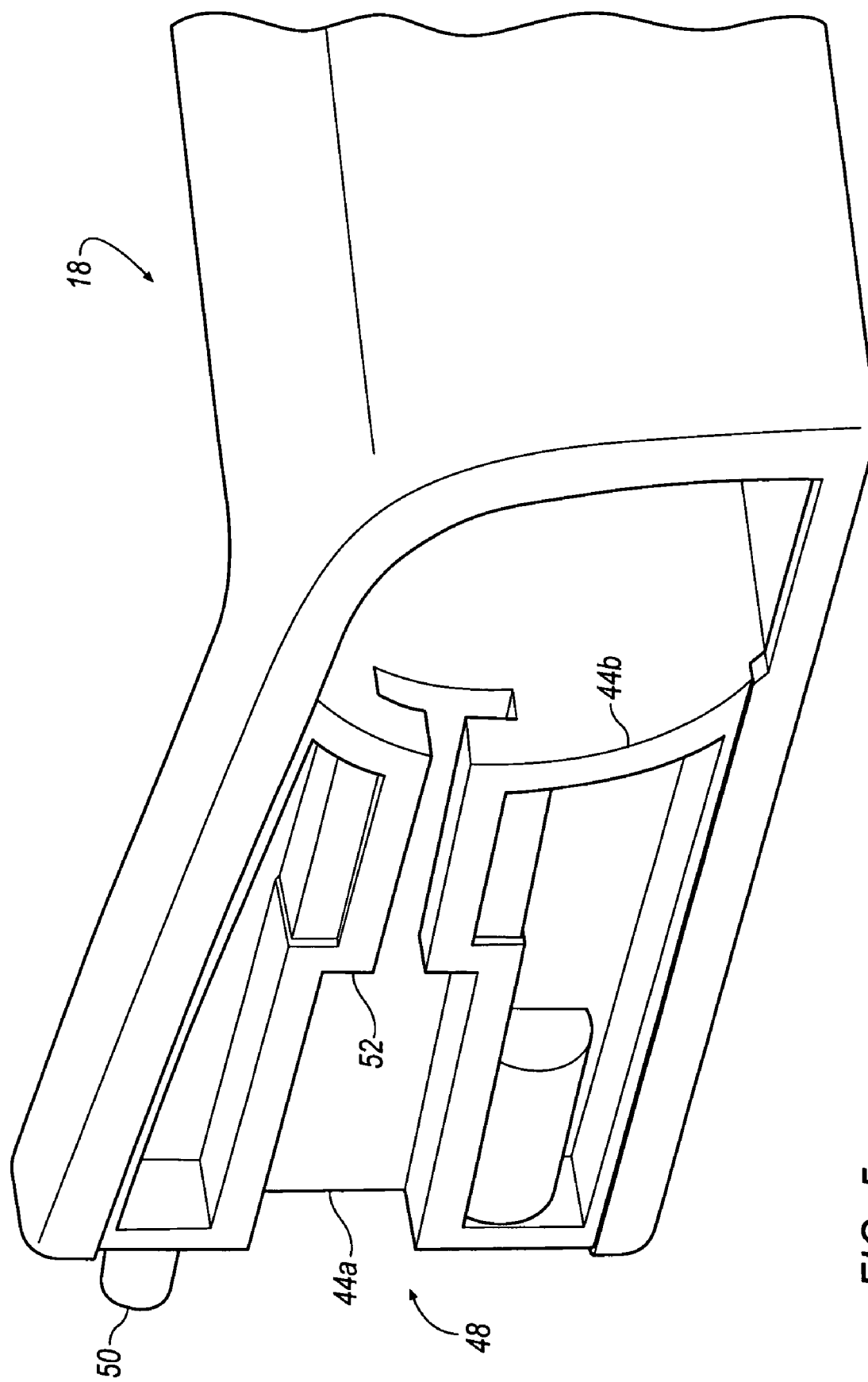
FIG. 5 is an enlarged perspective view of the wing of the grab handle according to an embodiment of the invention.

FIGS. 3-5 illustrate grab handle 18 isolated from armrest 16. Grab handle 18 may be generally U-shaped, and include two opposing side wings 44 with a handle area 46 therebetween. Side wings 44 may include locating pins 50 that extend outwardly past grab handle 18. It can be appreciated that grab handle 18 may be any desired dimensions so long as an adult hand (not shown) can comfortably wrap around the handle area 46. The two opposing side wings 44 of the grab handle 18 may be generally symmetric relative to each other.

FIGS. 4 and 5 illustrate enlarged views of side wing 44. Each side wing 44 includes a means for engaging tee locks 48. The means for engaging tee locks 48 may be integrated into each side wing 44 during the manufacture of the grab handle 18. Alternatively, means for engaging tee locks 48 may be manufactured separately and inserted into each side wing 44 of grab handle 18 during a secondary process.

The means for engaging tee locks 48 may be, for example, a reverse tapered guide 48 for guiding the grab handle 18 over tee locks 38. As illustrated, reverse tapered guide 48 may be defined as a slot that extends from an edge 44a of side wing 44 to an opposing edge 44b of side wing 44. Reverse tapered guide 48 slightly tapers from edge 44a of side wing 44 to a collar 52. At collar 52, reverse tapered guide 48 reduces in width and slightly tapers from collar 52 to opposing edge 44b. However, it can be appreciated that the invention may be practiced without collar 52. Thus, reversed tapered guide 48 may taper uniformly from edge 44a to opposing edge 44b.

FIG. 4 illustrates reverse tapered guide 48 as viewed from edge 44a of side wing 44, while FIG. 5 illustrates reverse tapered guide 48 as viewed from edge 44b of side wing 44.

When grab handle 18 is aligned with arm rest 16, tapered guide 42 of tee lock 38 may be aligned with reverse tapered guide 48 of grab handle 18. In an installed embodiment, grab handle 18 may be inserted into cavity 26 of armrest 16. Thus, tapered guide 42 of tee lock 38 may be inserted into reverse tapered guide 48. As a result, reverse tapered guide 48 is slightly larger than tapered guide 42 of tee lock 38. When installed, grab handle 18 pulls tee locks 38 toward each other, and therefore, pulls front and rear portions 28, 30 of armrest 16 towards each other. Consequentially, gaps that may exist between armrest 16 and grab handle 18 are equally reduced when tapered guide 42 of tee lock 38 engages reverse tapered guide 48 of side wings 44.

Grab handle 18 abuts against seat 40 of tee lock 38, thus reducing upward and downward movement of grab handle 18 relative to armrest 16. When grab handle 18 is inserted into armrest 16, locating pins 50 of grab handle 18 may be inserted into apertures 20 of substrate 10. Fasteners (not shown) may be inserted into the remaining apertures 20, thereby further securing the location of grab handle 18.

The embodiments disclosed herein have been discussed for the purpose of familiarizing the reader with novel aspects of the invention. Although preferred embodiments of the invention have been shown and described, many changes, modifications and substitutions may be made by one having ordinary skill in the art without necessarily departing from the spirit and scope of the invention as described in the following claims.

The invention claimed is:

1. An armrest assembly secured to a substrate comprising:
an armrest having a cavity and at least one tee lock;
a grab handle having a handle and at least one side wing extending therefrom, wherein a portion of the handle is substantially perpendicular to a portion of the side wing;
wherein the grab handle is secured to the cavity of the armrest, at least in part, by operatively engaging the at least one tee lock with the portion of the at least one side wing that is substantially perpendicular to the handle.

2. An armrest assembly according to claim 1, wherein the at least one side wing of the grab handle further includes a means for engaging the at least one tee lock.

3. An armrest assembly according to claim 1, wherein the cavity comprises of a U-shaped aperture formed by two opposing sidewalls of the armrest and the substrate.

4. An armrest assembly according to claim 3, wherein the at least one tee lock comprises a seat extending from an opposing sidewall of the two opposing sidewalls, respectively, and a tapered lead-in feature attached to the seat.

5. An armrest assembly according to claim 1, wherein the at least one tee lock comprises a seat and a tapered lead-in feature.

6. An armrest assembly according to claim 5, wherein the tapered lead-in feature of the at least one tee lock guides the grab handle into the cavity and the seat of the at least one tee lock supports the grab handle when the grab handle is inserted into the cavity of the armrest.

7. An armrest assembly according to claim 1, wherein the at least one side wing further includes a locating pin, and wherein the locating pin operatively engages an aperture in the substrate when the grab handle is inserted into the cavity of the armrest.

8. An armrest assembly according to claim 1, wherein the at least one side wing includes a reverse lead-in tapered feature for operatively engaging the at least one tee lock, and wherein the reverse lead-in tapered feature pulls the sidewalls of the armrest towards the grab handle.

9. A grab handle for a door assembly having a first portion including a first tee lock and a second portion including a second tee lock, comprising:
a first side wing including a first tee lock guide;
a second side wing including a second tee lock guide; and
a handle portion between the first and second side wings, wherein when the grab handle is installed, the first tee lock interfaces with the first tee lock guide and the second tee lock interfaces with the second tee lock guide, wherein said first and second tee look guides include a reverse-tapered portion having a slot that extends from a first edge to a second edge of each first and second side wing.

10. The grab handle according to claim 9, wherein the handle portion is disposed substantially between the first and second portions of the door assembly, wherein the first side wing is disposed substantially adjacent the first portion, wherein the second side wing is disposed substantially adjacent the second portion.

11. The grab handle according to claim 9, wherein one or both of said first side wing and said second side wing includes a locating pin adapted to be received in one or more corresponding apertures in the door assembly.

12. A grab handle for a door assembly having a first portion including a first tee lock and a second portion including a second tee lock, comprising:
a first side wing including a first tee lock guide;
a second side wing including a second tee lock guide; and
a handle portion between the first and second side wings, wherein when the grab handle is installed, the first tee lock interfaces with the first tee lock guide and the second tee lock interfaces with the second tee lock guide, wherein one or both of said first side wing and said second side wing includes a locating pin adapted to be received in one or more corresponding apertures in the door assembly.

13. The grab handle according to claim 12, wherein the handle portion is disposed substantially between the first and second portions of the door assembly, wherein the first side wing is disposed substantially adjacent the first portion, wherein the second side wing is disposed substantially adjacent the second portion.

* * * * *